United States Patent [19]

Lee et al.

[11] 3,728,721
[45] Apr. 17, 1973

[54] DIFFERENTIAL DOPPLER DETECTION FOR RF INTRUDER ALARM SYSTEMS

[75] Inventors: Alex Y. Lee, Arlington, Va.; David N. Gershberg, Rockville, Md.

[73] Assignee: The Mosler Safe Company, Hamilton, Ohio

[22] Filed: Jan. 28, 1971

[21] Appl. No.: 110,732

[52] U.S. Cl. ............... 343/5 PD, 340/258 A, 343/7.7
[51] Int. Cl. ................................................. G01s 9/42
[58] Field of Search ................ 340/258 A; 343/5 PD, 343/7.7

[56] References Cited

UNITED STATES PATENTS

| | | | |
|---|---|---|---|
| 3,046,548 | 7/1962 | Briskin | 343/7.7 |
| 3,386,094 | 5/1968 | Kratzer et al. | 343/7.7 X |
| 3,172,103 | 3/1965 | Wolcott | 343/7.7 |
| 3,483,558 | 12/1969 | Wiley | 343/7.7 |
| 3,383,678 | 5/1968 | Palmer | 343/5 PD |

Primary Examiner—Malcolm F. Husler
Attorney—Wood, Herron & Evans

[57] ABSTRACT

An intruder detection system in which an RF transmitter is connected through a length of transmission line to a transmit/receive antenna, both transmitter and antenna are matched to the line. Diode detectors are connected in opposite directions to the line at points spaced a quarter wave length apart. The diodes connect through low-pass filters to the balanced inputs of an AC coupled amplifier which extracts the doppler sine wave from the oppositely traveling transmitted and received waves on the line. The doppler sine wave is squared and the pulses are integrated to trigger an alarm. A band pass filter is so positioned in the line to reduce false alarms by defining a specific radio frequency bandwidth and also allows the detectors to be used to time the transmitter oscillator.

11 Claims, 2 Drawing Figures

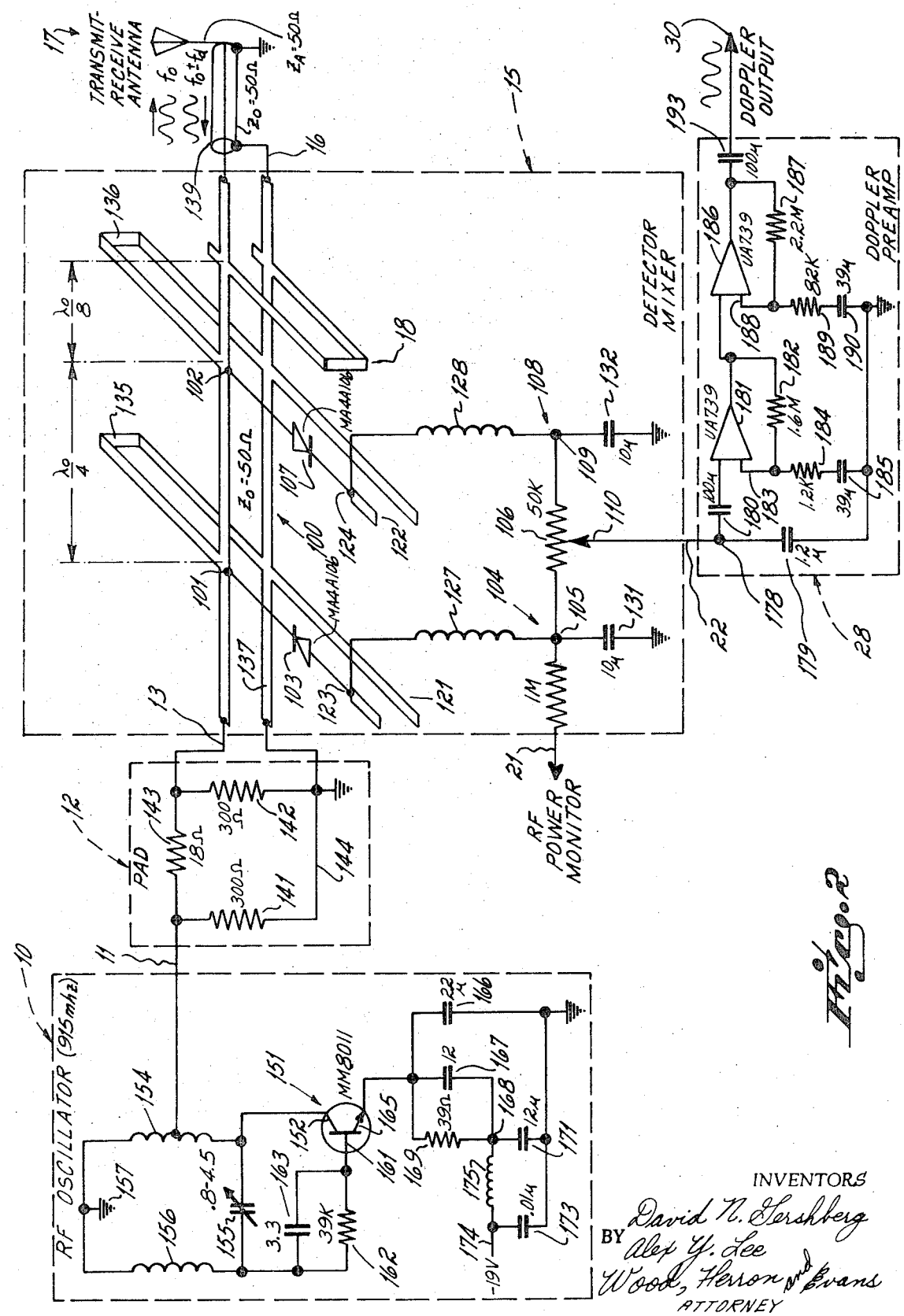

DIFFERENTIAL DOPPLER DETECTION FOR RF INTRUDER ALARM SYSTEMS

The present invention relates to intrusion alarm systems which operate on the doppler principle, and, more particularly, to the extracting of the doppler component from a radio signal reflected from a moving intruder.

Intrusion alarm systems of various types have been proposed in the prior art. One class of intrusion alarm system is the space alarm system. Space alarm systems are characterized by the transmitting of energy into the space of a chamber to be protected or the space surrounding an object to be protected, and subsequently receiving the portion of the transmitted energy that is reflected by the surroundings. An alarm is triggered upon detection of a disturbance in the reflected energy caused by an intruder within the area. One type of space alarm system operates on the Doppler principle. This type of system detects a doppler frequency shift in radiation reflected from moving objects within the space. The present invention pertains to space alarm systems of the doppler type, and more particularly to doppler systems in which the energy radiated is radio frequency electromagnetic radiation.

The most basic parameter in the optimization of any intrusion alarm system is the attaining of the highest probability of detection of an intruder, with the lowest probability of false alarm. An important point in the system for optimization is in that portion which first acquires the signal carrying the intruder information. In a Doppler space alarm system, this point is in the detector which extracts the Doppler signal from the received wave. An optimized detector will reliably detect the doppler signal while rejecting extraneous signals which can be confused with an intruder's doppler signal.

In many applications, such alarm systems are called upon to protect an extended area. In protecting such extending areas, certain problems are encountered. For example, a single unit of an alarm system which is sensitive to intruders at great distances from the antenna usually has an excessively high probability of responding to extraneous disturbances which originate nearer the antenna of the unit. On the other hand, a unit designed to have a more uniform sensitivity both near and far from an antenna is more likely to respond to disturbances originating beyond the confines of the area being protected. Therefore, for the uniform coverage of an extended area, it is generally desirable to employ a plurality of units distributed about the area to be protected. Furthermore, the area being protected frequently covers many separate rooms which also must be protected by separate units. Therefore, it is important not only to provide great reliability in such a detection system, but to provide one which is compact, low in cost, and which can be manufactured easily in large quantities to very high tolerances.

In RF Doppler systems, it is generally desirable to employ a single transmit/receive antenna to conserve space, reduce costs, to simplify the system design and to increase reliability. The circuits of such systems must, furthermore, be capable of supplying continuous wave power to the antenna, while simultaneously extracting information from a relatively weak doppler return signal. The frequency difference between the transmitted signal and the doppler shifted return signal is relatively low, usually sub-audible, and lies within a range which is highly susceptible to noise. Conventional methods differentiating between the outgoing and incoming energy usually employ circulators or hybrid rings and complex low 1/f noise doppler frequency preamplifiers. Such arrangements encounter difficulties in alarm system applications with regard to interfering signals, have resulted in difficulty in achieving a balanced input to the mixer stage, and have further resulted in exceptionally high losses in power when adopted to doppler space alarm applications. These arrangements are also more costly, complex and less reliable than the present invention.

It is an objective of the present invention to provide an RF doppler detector for an intrusion alarm system which has high sensitivity to doppler signals produced by intruders, but which has high rejection of certain extraneous modulations on the carrier signal. It is a further objective of the present invention to provide a detector for such systems which is low in cost, high in reliability, and can be easily duplicated to high tolerances in quantity, and particularly, to provide a detector which does not require a complex doppler frequency preamplifier.

The present invention takes into account that disturbances in the field of a matched transmitter antenna affects the impedance of the antenna and contributes some reflection which will appear as a standing wave on the transmission line which connects the antenna with the transmitter. Such reflections from permanently stationed objects are of no concern in this system because the doppler amplifier is AC coupled. However, a moving object in the antenna field reflects a doppler shifted signal which contributes a very weak rippling or time varying standing wave pattern on the antenna feed line which is coupled to the doppler amplifier.

The present invention is predicated in part on the concept of extracting the doppler frequency component of the reflected signal from this rippling envelope pattern on the antenna feed line caused by the oppositely traveling transmitted wave and received wave as reflected from a moving intruder and bearing doppler modulation. The present invention achieves this by lightly coupling two detectors to the feed line at points spaced apart by a quarter of the RF wave length, and to differentially compare the detected outputs to extract the doppler signal. The differential detection is provided by employing, as the detectors, oppositely directed matched diodes which connect to the inputs of an operational amplifier. The light coupling of the detectors minimizes the creation of a standing wave on the transmission line.

Further provided is a band pass filter connected to the transmission line between the nearest diode to the antenna and the antenna, one-eighth wave from the diode. This presents a very high shunt impedance to the tuned signal frequency and this produces little effect. When the transmitter is tuned off the center frequency this impedance decreases to create a significant impedance mismatch on the line. The standing wave that this produces has an increased voltage at one diode and a decreased voltage at the other, which enables the differential output to be used in tuning the oscillator.

One of the advantages of the present invention is that it provides a detector which is able to detect very weak doppler signals of low frequency, and which is insensitive to certain interferences, as for example, amplitude modulation on a transmitted signal of the type caused by power supply ripple. Such modulation will not cause interfering signals since they affect the two detectors equally and are therefore cancelled in detection. Furthermore, the modulation of the transmitted signal itself which lies outside of the doppler pass band will be rejected. Also, external RF signals, containing modulation components, which do not beat into the doppler pass band will be rejected by the balanced detectors.

Further advantages of the present invention lie in the provision for a detector which is durable and reliable, and can be economically produced to high tolerances in large quantities.

More specifically, the above system will have a lower false alarm rate than existing systems of comparable complexity because beat frequency modulation percentage at the diode detectors is independent of the transmitted power level when the beat results from a legitimate doppler return. However, beat modulation percentage due to interference decreases as the transmitter power is increased, thereby improving the doppler-to-interference ratio. Also, the utilization of high level detection eliminates the requirements for an expensive, low l/f noise doppler preamplifier that is usually found in doppler systems.

Additional advantages of the system arise out of its total simplicity. The circuit is easily reproduced and the limited number of parts required makes the system both reliable and economical. The RF circuitry provides a self-testing feature in that the DC level at one or both detector diodes can be monitored.

These and other objects and advantages of the present invention will be more readily apparent from the following detailed description of the drawings, illustrating one preferred form of a differential doppler detector for a radio frequency intrusion alarm system according to the principles of the present invention, in which:

FIG. 1 is a block diagram of a radio frequency intruder alarm system employing a differential doppler detector according to the principles of the present invention; and FIG. 2 is a schematic diagram, partially in perspective, illustrating particularly the radio frequency portion of the system of FIG. 1.

GENERAL DESCRIPTION AND OPERATION

Referring first to FIG. 1, a radio frequency transmitter oscillator 10 is provided, having an output 11 connecting through a resistive pad 12 to the transmitter input 13 of a detector mixer 15. The RF output 16 from the mixer 15 is connected to a transmit-receive antenna 17. Connected between the antenna 17 and the mixer 15 is a band pass filter 18. The mixer 15 is provided with two outputs, a first output 21 carries a signal which indicates the presence of RF power from the transmitter, and a second output 22 which carries the doppler component of the received signal, that is, a signal representing the difference between the transmitted and received RF signals.

The signal at the output 21 is a DC signal proportional to the level of the RF power from the oscillator 10. This signal is detected by a DC level sensor 24 which generates an alarm signal at its outputs 25 if the RF signal falls below a certain prescribed magnitude.

The output 22 is connected to an input of the doppler pre-amplifier 28 which has its reference inputs 29 connected to ground. The output 30 of the pre-amplifier 28 is connected to the input of a 1 to 10 hz doppler filter 32. This filter 32 defines the accepted band width of the doppler signal.

The sinusoidal doppler signal at the output 33 of the filter 32 is fed through a Schmitt trigger 35 where the signal is blocked to a square wave of the doppler frequency. This square wave appears at the output 36 of the trigger 35. The output 36 of the trigger 35 is fed to an input of the AND-gate 38. The output of the AND-gate 38 is connected to the input 39 of the pulse counter 40. A gate input 41 of the AND-gate 38 is also provided. When a signal is present at the input 41 of the AND-gate 38, the square wave doppler pulses, if present, are passed through the AND-gate 38 and are counted or accumulated in the pulse counter 40. When a specified number of pulses are accumulated in the pulse counter 40, an alarm signal at the output 43 of the pulse counter 40 is fed to the alarm 44 to trigger the alarm. The output of the AND-gate 38 is connected to the input 45 of a timer 46. The timer 46 operates as a one-shot multi-vibrator to generate a delayed pulse after some specified time delay from the time the first pulse from the trigger 35 is received at the input 45. The delayed pulse appearing at the output 47 of the timer 46 is fed to a reset input 48 of the pulse counter 40 to reset the counter. If the specified number of pulses have not been received by the pulse counter 40 in the prescribed time set by the timer 46, the counter will be reset and the alarm will not be triggered until such time as the specified number of pulses pass through the gate 38 within the specified time interval. In this way, extraneous pulses and small motions detected, but which are not likely to be caused by an intruder, are rejected, and the probability of false alarms due to such causes is reduced.

To provide further reduction in the probability of false alarms, the gate input 41 of the AND-gate 38 is connected to an independent alarm system which responds in a given way to the presence of an intruder. Such a system, for example, may be an ultrasonic alarm system which, like the RF alarm system, above described, will respond to the presence of an intruder, but which because of the difference between ultrasonic and radio frequency radiation will respond in different ways and to different types of extraneous disturbances. The signal from this secondary system at the input 41 of the gate 38 will enable the gate to permit passage of the discrete pulses through the trigger 35. The concept of providing independent intruder detection systems in which the outputs are correlated in such a manner that a constant threshold signal from one system, for example at gate input 41, to enable the passage of doppler frequency pulses as, for example, at the output 36, and then a counting of these pulses, is described in detail in the copending application of John Antonio for Intruder Alarm Electromagnetic and Ultrasonic Doppler Correlation System, Ser. No. 110,735 filed on Jan. 28, 1971.

The detector mixer 15 includes a transmission line 100 connected between the pad 12 and the antenna 17. The transmission line 100 has preferably a constant characteristic impedance throughout its length, which is equal to the impedance of the antenna 17 and the reverse impedance of the pad 12. In the preferred embodiment, the characteristic impedance is 50 ohms. The line 100 is therefore terminated at each end in a matched load of 50 ohms. The RF power from the oscillator 10 is at a frequency of 915 mhz for the preferred intruder detection system. The transmission line 100 is provided with two contact points 101 and 102 spaced one-quarter wave length apart along the transmission line 100. Connected to each of these points are a pair of high impedance or lightly coupled minimum energy detectors. A first detector includes a diode 103 having its cathode connected to the point 101 on the transmission line 100, and its anode connected through a low pass filter 104 to the end 105 of a potentiometer 106. The terminal 105 is also connected to the output 21 of the mixer 15. Similarly, a diode 107 has its anode connected to the point 102 of the transmission line 100 and its cathode connected through a low pass filter 108 to the other end 109 of the potentiometer 106. The wiper 110 of the potentiometer 106 is connected to the doppler output 22 of the mixer 15. The wiper 110 is adjusted on the potentiometer 106 to an impedance point equidistant between the end points 105 and 109. In this manner, signals equal in magnitude but opposite in sign applied to each of the points 105 and 109, respectively, will result in a zero output signal at the terminal 22.

Because the diodes 103 and 107 are reverse connected to the transmission line 100, a continuous wave RF signal on the line 100 will result in envelope detection by the diodes 103 and 107 of signals which are equal in magnitude but opposite in polarity, thus yielding a zero level signal at the output 22. When a received signal is present, on the transmission line traveling in the opposite direction of the transmitted signal, a standing wave will appear on the transmission line 100 which has its maximum and minimum points at different points which are dependent upon the relative phase of the transmitted and received signals. When viewing the envelope of the resultant wave on the transmission line 100, at the two points 101 and 102 which are spaced a quarter wave apart, it will be found that, for a given phase relationship of the wave, the transmitted and reflected components will add at one of the points in a 180° phase relationship with respect to the manner in which they add at the other of the points. For example, a wave having a given phase relationship between components at point 101 will appear at point 102 with the transmitted signal lagging by a quarter of a wave to the spacing of the points in the direction of the transmitted signal on the transmission line 100, and the received wave will be leading by a quarter of a wave length at the point 102 due to the opposite direction of the received signal on the transmission line 100. Thus the signals will add at one point and subtract at the other. As long as there is no relative phase change in the received wave with respect to the transmitted wave, this standing wave will be stationary on the line 100. This DC signal will not pass through the amplifier-filter combination 28 and 30, but if there is any phase rate of change of the received wave with respect to the transmitted wave due, for example, to a doppler shift in the transmitted wave as is reflected from a moving object, a standing wave will move along the line at the doppler frequency. This wave will pass through the diodes 103 and 107 in the opposite senses and the low-pass filters 104 and 108 to be applied to the opposite end of the potentiometer 106 to cause the doppler frequency signal to appear at the wiper 110 of the potentiometer 106 and at the output 22 of the detector mixer 15.

Connected to the transmission line at a point one-eighth of a wave length from the point 102 toward the antenna 17 is a band pass filter 18. This filter is tuned to the frequency of the transmitter wave, which is the same frequency which controls the spacing between the points 101 and 102 and between the point 102 and the filter 18. Because the transmission line is matched to the antenna at this tuned frequency, reflections of the transmitter wave from the filter 18 are minimized. However, if the oscillator 10 is mis-tuned to any degree, the transmitted wave will reflect back along the transmission line due to the sharply tuned filter 18, and a standing wave will appear on line 100 which will increase the voltage at one of the points 101 or 102 and decrease the voltage at the other of the points 101 or 102. This results in a DC signal to appear at the contact 110 of the potentiometer 106. This potential output is nulled to facilitate tuning of the oscillator 10.

DETAILED DESCRIPTION

Figure 1:
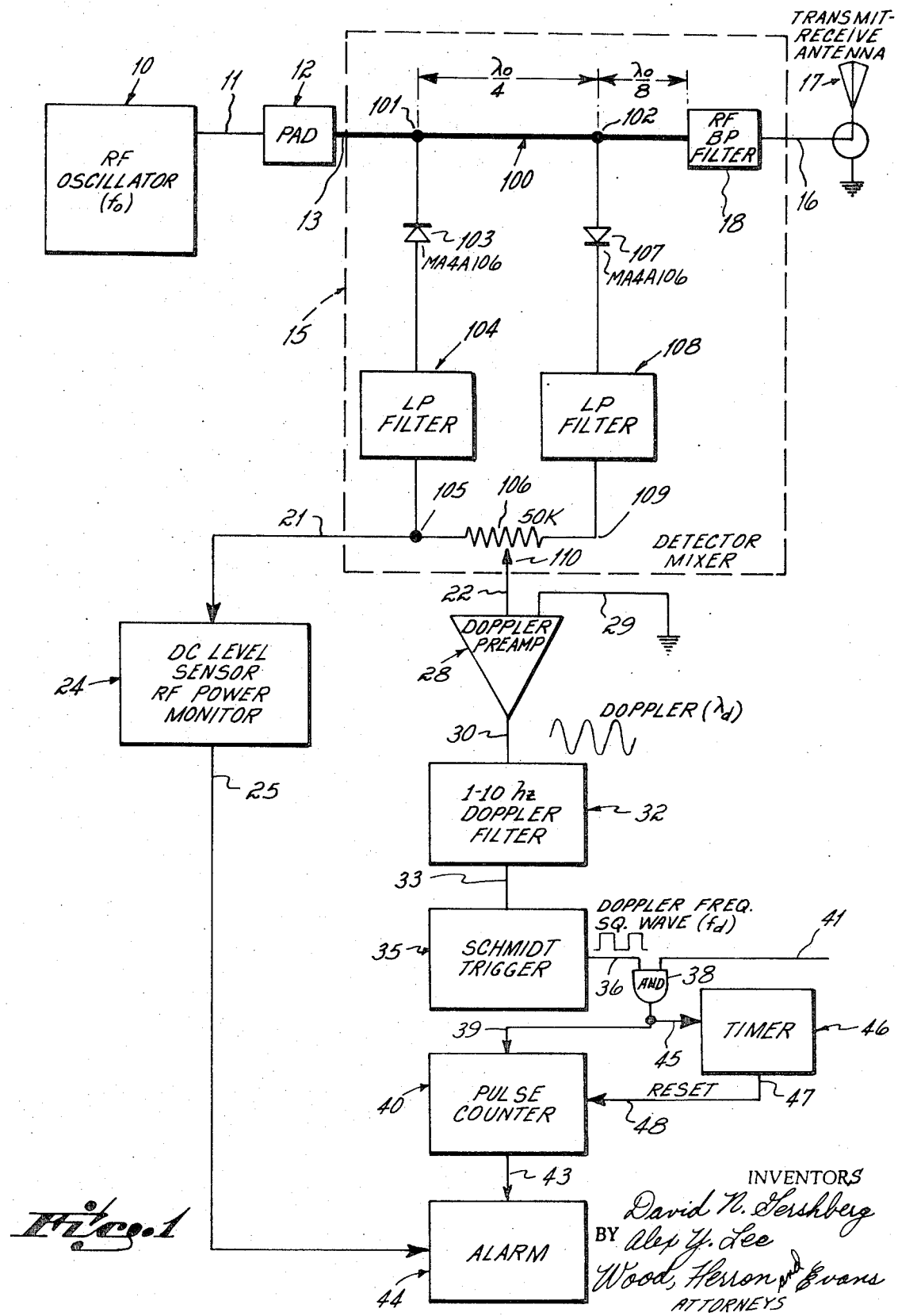

Referring now to FIG. 2, the details of the oscillator 10, the pad 12, the detector mixer 15, and the doppler preamplifier 28 are illustrated. Considering first the detector-mixer 15, the transmission line 100 is a microstrip transmission line having a characteristic impedance of 50 ohms. The transmission line 100 is made up of an etched double clad printed circuit board of the commercially available Teflon dielectric type. The plating on one side of the board makes up a ground conductor 137, and the plating on the other side of the board makes up the other conductor of the transmission line 100. The diodes 103 and 107 are a matched pair of diodes selected for their similarity in characteristics. The diodes are each connected in series with open circuited stubs 121 and 122. At the junctures 123 and 124 between the diodes 103 and 107 respectively and the open circuited stubs are connected low pass filters 104 and 108. The low pass filters consist of inductances 127 and 128, respectively connected between the points 123 and 124 and the opposite ends 105 and 109 of the potentiometer 106. A pair of capacitors 131 and 132, respectively connected between the points 105 and 109 and ground, further make up the filters 104 and 108, respectively.

At the points 101 and 102 of the transmission line, the connection of the diodes 103 and 107 present relatively high impedances to the transmission line 100. However, even though these impedances are relatively high with respect to the characteristic impedance of the line 100, a slight reactive and resistive mis-match will occur, and to compensate for the reactive part the shorted stubs 135 and 136 are respectively shunted across the respective points 101 and 102 of the transmission line. Because the diodes 103 and 107 appear slightly capacitive across the transmission line, the stubs are selected of such a length that they will appear inductive to present an impedance equal in magnitude but opposite in sign to that of the diodes, at the points 101 and 102, thereby cancelling the effect of the diode detector reactance on the transmission line 100.

The band pass filter 18 is also a shorted stub resonator, which is selected to be of such a length as to be resonant at the selected center of frequency of the oscillator 10. This filter 18 will appear as a very high shunt impedance to signals at the center of frequency.

The output 16 of the mixer 15 is connected through a 50 ohm transmission line to the transmit-receive antenna 17 which is matched to the 50 ohm line. The input 13 of the mixer 15 is connected across a resistive pad 12. The impedance of the pad 12 to received signals moving toward the transmitter 10 is 50 ohms, and is matched to the impedance of the transmission line 100. The pad 12 includes a resistor 141 of 300 ohms connected through the input 11 of the pad 12 and a ground line 144, and a 300 ohm resistor 142 connected through the output 13 of the pad 12 and the ground line 144. Connected between the output 11 and the output 13 of the pad 12 is an 18 ohm resistor 143. The pad matches the transmission line for incoming signals which improves the detector sensitivity for intruder caused signals. The improved match also improves the detector balance and therefore the rejection of interfering signals. These improvements greatly reduce false alarms.

The oscillator 10 includes an NPN transistor 151 which has its collector 152 connected through an inductor 154 and ground 157. The collector 152 is also connected through a variable tuning capacitor 155 and a second inductor 156 to ground 157. The inductors 154 and 156 are parallel line inductors etched into the same printed circuit board as the transmission line 100 of the mixer 15. It has been found that inductors constructed in this manner exhibit excellent temperature stability at the preferred frequency of 915 mhz. It is noted that the ground point 157 in the diagram of FIG. 2 represents an extension of the ground conductors 137 of the transmission line 100 and the ground conductors 144 of the pad 12. Furthermore, the ground of the transmission line 139 which connects the mixer 15 to the antenna 17 is an extension of this ground line.

The base 161 of the transistor 151 is connected through a resistor 162 to the junction of the capacitor 155 and the inductor 156. Connected across a resistor 162 is a capacitor 163. The emitter 165 of the transistor 151 is connected to ground through the capacitor 166. The emitter 165 is also connected through a capacitor 167 to a node 168. Connected across the capacitor 167 is a resistor 169. Connected between the node 168 and ground is a capacitor 171. The node 168 is connected to a −19 volt regulated output of a power supply through a low pass filter consisting of a capacitor 173 connected between the power supply output 174 and ground, and an inductor 175 connected between the node 168 and the power supply output 174.

The amplifier 28 has an input 178 connected to the output 22 of the mixer 15, which is connected to the wiper contact 110 of the potentiometer 106 of the mixer 15. The input 178 is connected through a broad band pass filter consisting of a capacitor 179 shunted from the input 178 to ground, and a series capacitor 180 connecting the input 178 to an input of an amplifier 181. The output of the amplifier 181 is connected to a feedback resistor 182 to the opposite input 183 of the amplifier 181. The input 183 of the amplifier 181 is connected through a series circuit consisting of a resistor 184 and a capacitor 185 to ground. The output of the amplifier 181 is also connected to an input of a second amplifier 186 which has its output connected through a resistor 187 to the opposite input 188 of the amplifier 186. The input 188 of the amplifier 186 is connected through a series circuit consisting of a resistor 189 and a capacitor 190 to ground. The output of the amplifier 186 is connected through a capacitor 193 to the output 30 of the amplifier circuit 28. The amplifier 28 has an AC bandwidth which spans the desired doppler frequency band of 1 to 10 hz.

As will be clearly understood from FIG. 1, the AC signal at the output 30 is passed through the doppler band pass filter 32 to eliminate all but the desired doppler frequency from the output of the amplifier 28, and to feed these doppler frequency signals to the Schmitt trigger 35, where they are blocked to a square wave of doppler frequency and fed to the processer which includes the AND-gate 38, the timer 46, and the counter 40 which energizes the alarm 44.

We claim:

1. A method for detecting an intruder moving within a given area under surveillance with a system which includes an alarm indicator, a transmitter, an antenna, and a feed line connecting said transmitter with said antenna; said method comprising the steps of:

transmitting electromagnetic energy along said line from said transmitter to said antenna;

radiating said transmitted energy from said antenna and into said area;

receiving at said antenna said radiated energy as reflected by objects within said area, and propagating said received energy along said line toward said transmitter;

sampling doppler frequency components of the resultant of the oppositely traveling transmitted and received energy on said line at points spaced apart by one-quarter of the wave length of said electromagnetic energy to extract doppler signal information from the energy reflected from said moving intruder;

differentially combining the energy sampled by said elements to produce said doppler signal; and actuating said alarm indicator in response to said doppler signal.

2. In an intrusion alarm system operative to produce an alarm in response to the presence, within a given area, of a moving intruder; said system having an alarm indicator, a transmitter for generating electromagnetic energy of a given radio frequency, an antenna for radiating said energy throughout said area and for receiving said radiated energy as reflected by objects within said area, a feed line connecting the output of said transmitter with said antenna, and means for extracting a doppler signal from the energy reflected from said moving intruder, said doppler signal extracting means comprising:

means for sampling doppler frequency components of the resultant of oppositely traveling transmitted and received energy on said line;

said sampling means including a pair of elements coupled to said line at points spaced apart by one-quarter of the wave length of said electromagnetic energy;

means for differentially combining the energy sampled by said elements to produce said doppler signal; and means for actuating said alarm indicator in response to said doppler signal.

3. In an intrusion alarm system operative to produce an alarm in response to the presence, within a given area, of a moving intruder; said system having an alarm indicator, a transmitter for generating electromagnetic energy of a given radio frequency, an antenna for radiating said energy throughout said area and for receiving said radiated energy as reflected by objects within said area, a feed line connecting the output of said transmitter with said antenna, and means for extracting a doppler signal from the energy reflected from said moving intruder, said doppler signal extracting means comprising:

a pair of detectors coupled to said line at points spaced apart by one-quarter of the wave length of said electromagnetic energy for sampling doppler frequency fluctuations in the envelope of the resultant of oppositely traveling transmitted and received energy on said line;

a differential amplifier circuit having an output and a pair of inputs, one connected to each of said detectors, so as to produce a signal corresponding to said envelope fluctuations at said output; and signal processing means including a doppler band pass filter connected to the output of said amplifier, and means connected between the output of said filter and said alarm indicator for actuating said alarm indicator in response to a predetermined minimum signal from said amplifier.

4. In an intrusion alarm system operative to produce an alarm in response to the presence, within a given area, of a moving intruder; said system having an alarm indicator, means for producing a doppler signal in response to the motion of said intruder within said area, and means for actuating said alarm indicator in response to a predetermined minimum doppler signal, said doppler signal producing means comprising:

a transmitter for generating electromagnetic energy of a given radio frequency, an antenna for radiating said energy throughout said area and for receiving said radiated energy as reflected by objects within said area, a feed line connecting the output of said transmitter with said antenna;

said antenna being matched to the characteristic impedance of said feed line to present a matched load to signals from said transmitter, and said transmitter being matched to said impedance to present a matched load to signals from said antenna;

a pair of detectors coupled to said line at points spaced apart by one-quarter of the wavelength of said electromagnetic energy;

a pair of low pass filters, one connected to each of said detectors; and a differential amplifier having a pair of inputs, one AC coupled to the outputs of each of said filters, and having an output connected to said alarm indicator actuating means.

5. An intrusion alarm system according to claim 4 further comprising:

a resistive pad connected between said feed line and said transmitter.

6. An intrusion alarm system according to claim 4 wherein said detectors comprise a pair of reverse connected diodes.

7. An intrusion alarm system according to claim 4 wherein the characteristic impedance of said line is 50 ohms.

8. An intrusion alarm system according to claim 4 wherein said given frequency is in the order of 915 megahertz.

9. An intrusion alarm system according to claim 4 further comprising:

a band pass filter tuned to said given frequency and connected in said line at a point one-eighth of the wave length of said energy from said antenna most diode and between said antenna and the detector nearest said antenna.

10. In a transmitting system including a transmitter tunable about a given frequency, an antenna, and a transmission line connecting said transmitter with said antenna, said antenna and transmitter being matched to the characteristic impedance of said line; a transmitter tuning indicator circuit comprising:

a pair of envelope detectors coupled to said line at points spaced apart by one-quarter of the wavelength of a wave on said line at said given frequency;

a narrow band pass filter tuned to said given frequency and connected to said line between the antenna and the detector nearest said antenna, said filter being spaced from said antenna-most detector one-eighth of the wavelength of the signal at said given frequency; and means for differentially comparing the signals from said detector and for generating a tuning indication signal in response to the difference between said detector signals.

11. A detector circuit for producing, at the output of said detector, a small difference frequency signal from oppositely traveling waves on a transmission line, said line being terminated at each end in a load matched to the characteristic impedance of the line; said detector comprising:

a pair of detector elements coupled to said line at points spaced apart by one-quarter of the wavelength of one of the waves traveling on said line;

a pair of low pass filters, one connected to each of said detectors; and a differential amplifier having a pair of inputs, one AC coupled to the outputs of each of said filters; said amplifier having an output connected to the output of said detector circuit.

* * * * *